United States Patent

[11] 3,575,612

[72] Inventor Lawrence M. Lunn
Indianapolis, Ind.

[21] Appl. No. 733,548
[22] Filed May 31, 1968
[45] Patented Apr. 20, 1971
[73] Assignee RCA Corporation

[54] FET CONTROL SYSTEM EMPLOYING A STORAGE CAPACITOR AND SWITCHING TUBE MEANS
10 Claims, 1 Drawing Fig.

[52] U.S. Cl. 307/238, 307/316, 315/84.5, 328/84, 328/125
[51] Int. Cl. H03k 25/02
[50] Field of Search 307/205, 238, 251, 279, 296, 297, 304, 316; 328/125, 126, 82, 84, 210; 315/84.5; 330/38 (FE)

[56] References Cited

UNITED STATES PATENTS

| | | | |
|---|---|---|---|
| 2,828,447 | 3/1958 | Mauchly | 328/125X |
| 2,901,641 | 8/1959 | Wolf | 315/84.5X |
| 3,079,560 | 2/1963 | Richards | 307/316X |
| 3,361,082 | 1/1968 | Leslie | 307/252X |
| 3,373,295 | 3/1968 | Lambert | 307/238 |
| 3,438,189 | 4/1969 | Gasser et al. | 307/304X |
| 3,461,325 | 8/1969 | Barrett | 307/251X |
| 3,463,993 | 8/1969 | Beck et al. | 307/238X |
| 3,482,167 | 12/1969 | Kaplan et al. | 307/304X |

OTHER REFERENCES

IBM Technical Disclosure Bulletin, Vol 8, No. 6, Nov. 1965, pp 912&913, titled ANALOG OUTPUT FOR DIRECT DIGITAL CONTROL, by Steele & Mendez. A copy is located in 307/304 in Art Unit 254.

IBM Technical Disclosure Bulletin, Vol. 9, No. 7, Dec. 1966, pp 916 & 917, 917, titled ANALOG STORAGE CIRCUIT by J.W. Beck. A copy is located in 307/238 in Art Unit 254.

*Primary Examiner*—Stanley T. Krawczewicz
*Attorney*—Eugene M. Whitacre

ABSTRACT: A field effect transistor control unit having a storage capacitor associated with its gate electrode and employing a switching tube circuit arrangement to improve the ability of the unit to retain the charge on the capacitor.

PATENTED APR 20 1971
3,575,612
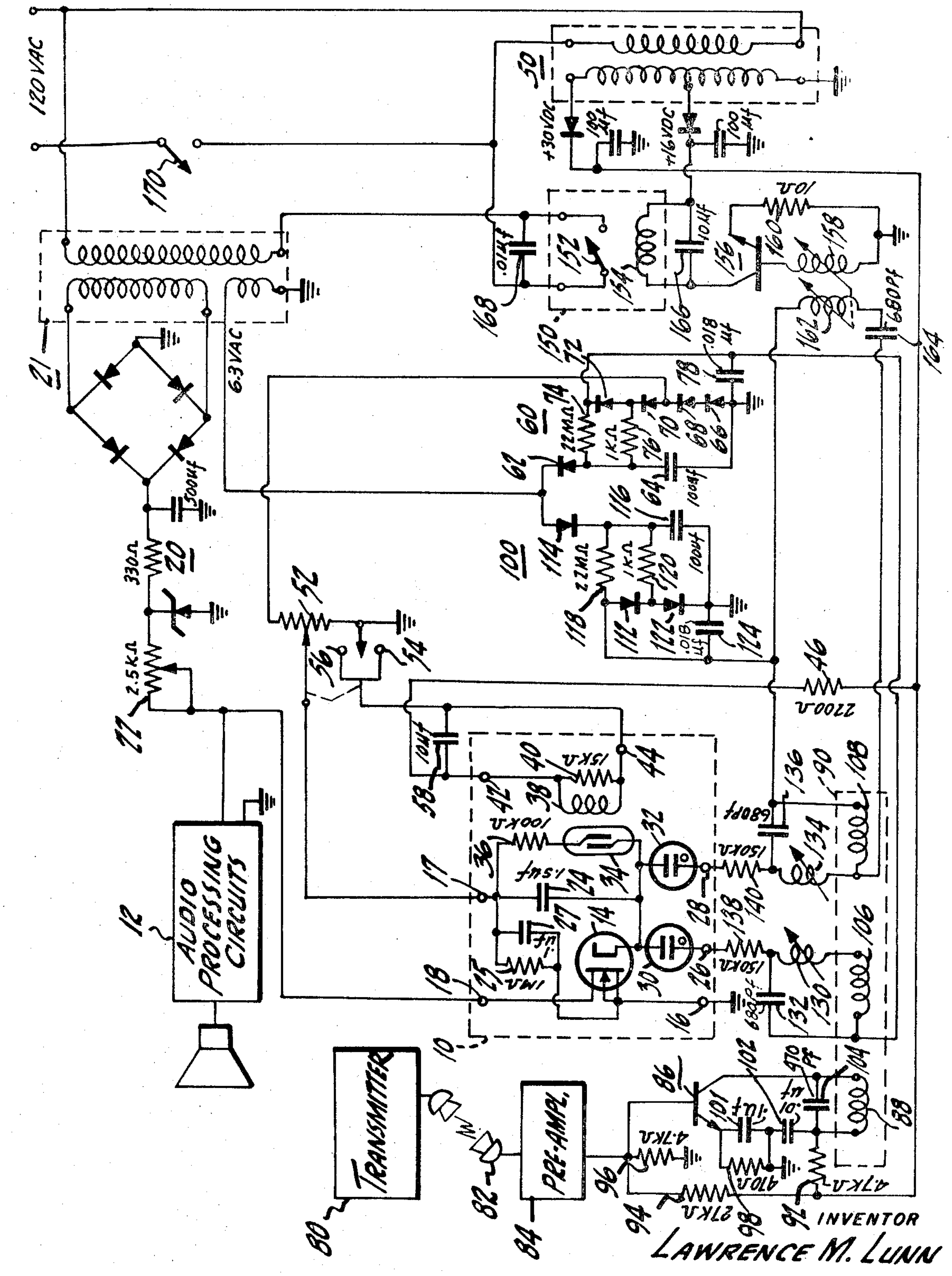
INVENTOR
LAWRENCE M. LUNN
BY Eugene M. Whitacre
ATTORNEY

FET CONTROL SYSTEM EMPLOYING A STORAGE CAPACITOR AND SWITCHING TUBE MEANS

The present invention pertains to control systems, and more particularly, to a control system utilizing field effect transistors (FET) for controlling various functions in electronic apparatus.

The use of field effect transistors in conjunction with a storage capacitor associated with the gate electrode of the device as a memory or control unit is known. For example, a thesis prepared by T. D. Martin entitled "Circuit Applications of the Field-Effect Transistor", deposited with the University of Pennsylvania library in Apr. 1960 and later published as an article in "Semiconductor Products" in Feb. 1962, pages 33 to 39, discloses the use of a field effect transistor as an analog memory. The basic concept is to charge the capacitor associated with the FET control electrode to a set level and due to the high input impedance of FET devices, the charge remains on the capacitor and establishes a level of conductivity in the device. Nevertheless, prior systems employing FETs with a capacitor associated with the gate electrode have suffered from leakage of the stored charge on the capacitor with resultant change in level of the conductivity of the device because of the change in voltage at the control electrode. One source of leakage has been through the switching means which couples the storage capacitor and the source of control voltage utilized to charge the capacitor.

An electric circuit embodying the present invention includes a field effect transistor operated from a source of operating potential. A storage capacitor is connected to the gate electrode of the transistor for storing a control voltage to determine the conductivity of the source to drain electrode path of the device. A switching tube interconnects the gate electrode of the transistor and a source of control voltage.

A complete understanding of the invention may be obtained from the following detailed description of a specific embodiment thereof, when taken in conjunction with the accompanying drawing which is a schematic circuit diagram of a control system embodying the present invention.

Referring now to the drawing, an FET control module 10 controls the audio signal processing circuitry 12 of a television receiver. It is to be understood that the FET control module 10 may be adapted to control other signal processing circuitry, and may for example, be used in the color and tint control circuitry of the receiver.

The module 10, which is an encapsulated unit to prevent a deterioration of the module components due to environmental conditions, includes a metal oxide semiconductor (MOS) type insulated gate field effect transistor 14. The source and substrate electrodes of the transistor 14 are connected to ground through a module terminal 16. The drain electrode of the transistor 14 is connected by way of the module terminal 18 and a variable resistor 22 to a source of operating potential 20. The takeoff point to the audio processing circuitry 12 is at the junction of the resistor 22 and the module terminal 18.

A storage capacitor 24 is connected from the gate electrode of the transistor 14 through a module terminal 17 to manual adjustment circuitry including a resistor 52 with a slider. The manual adjustment circuitry permits the establishment of a voltage at terminal 17 which, in conjunction with the voltage on the storage capacitor 24, produces a voltage between the gate electrode and the source electrode of the transistor 14. This establishes a conductivity level in the device or, put another way, establishes the impedance of the source to drain electrode path which is utilized to control the audio processing circuitry 12.

The gate electrode of the transistor 14 is also connected to two module terminals 26 and 28 by two neon switching tubes 30 and 32, respectively. These neon tubes connect the storage capacitor 24 to remote control circuitry of a type to be hereinafter described. A reed switch 34 in series with a resistor 36 is connected in parallel with the storage capacitor 24 to provide, when the reed switch contacts are closed, a discharge path for the storage capacitor 24. The reed switch is actuated by energization of the parallel combination of a winding 38 and a resistor 40 which is connected between two module terminals 42 and 44. The terminal 42 is connected by a resistor 46 to a source of potential derived from a transformer diode arrangement 50. The connection to terminal 44 is described below.

A resistor 25 and a capacitor 27 are connected in parallel between the module terminal 17 and the source and substrate electrodes and provide a protective circuit for the transistor 14 when it is not a part of the system. This protective circuit insures that a static charge will not build up which may destroy the device. In addition, the capacitor 27 acts as an AC bypass to ground for the tap of the adjustable resistor 52 of the manual adjustment circuitry, to which the module terminal 17 is connected.

Manual adjustment of the gate to source potential of the field effect transistor 14 and, hence, the conductivity level of the device 14 is achieved by an adjustment of the tap on the variable resistor 52. Movement of the tap on the resistor 52 results in a ganged movement of contacts 54 and 56 which are connected to ground while manual adjustments are made. The contacts 54 and 56 are connected to the module terminal 44 and, hence, their closing results in an energization of the winding 38 and consequently, a closing of the reeds of the switch 34. This causes the storage capacitor 24 to discharge through resistor 36, such that when the reed switch opens upon completion of the manual adjustment, the input voltage (gate to source) of transistor 14 is equal to the voltage provided at the slide of the adjustable resistor 52. The reed switch 34 thus provides a means for resetting the input voltage of transistor 14 to a desired reference level. A capacitor 58 connected between the module terminals 42 and 44 slows down the rate of collapse of the magnetic field associated with the winding 38 when the contacts 54 and 56 are open to prevent damage to the transistor 14.

The adjustable resistor 52 is connected to a source of negative control voltage 60. The source of negative control voltage includes a diode 62 and a capacitor 64 serially connected between a secondary winding on a transformer 21 and ground, transformer 21 being supplied with AC line voltage. Four serially connected diodes 66, 68, 70 and 72 are connected between ground and a resistor 74 which interconnects the cathode electrode of the diode 72 and the anode electrode of the diode 62. A resistor 76 interconnects the anode of the diode 72 and the anode of the diode 62. A capacitor 78 connected in parallel with the four serially connected diodes bypasses AC signals to ground. The top end of the adjustable resistor 52 of the manual adjustment circuitry is connected at the junction of the diodes 68 and 70, as shown, and hence, to a voltage twice the diode anode-cathode voltage drop above ground—typically twice 0.7 volts or a total of 1.4 volts for silicon diodes. Since the bottom end of the variable resistor 52 is connected to ground, the tap on the resistor 52 can be set at any voltage between 0 and −1.4 volts to establish that same voltage at the module terminal 17.

The control system can also be operated from a remote transmitter 80 which transmits any one of a series of predetermined signals. These transmitted signals are picked up by a microphone 82 and amplified in a preamplifier 84. The signals are then coupled to the base electrode of a transistor 86 which is the active device of a driver stage to energize the primary winding 88 of a transformer 90. Operating power to the collector electrode of the transistor 86 is provided through the winding 88 and a resistor 92 which couples the primary winding 88 to the source of operating potential 50. Two serially connected resistors 94 and 96 coupled across the source 50 provide at their junction the bias potential for the base electrode of the transistor 86. Parallel connected resistor 98 and capacitor 101 couple the emitter electrode of the transistor 86 to ground. A capacitor 102 connected between the junction of resistor 92 and the winding 88 with ground provides an AC bypass for the resistor 92. Capacitor 104 coupled across the winding 88 enables the primary winding of the transformer 90 to be tuned.

The transformer 90 also includes two secondary windings 106 and 108. The winding 106 is connected by its left-hand terminal to the source of negative control voltage 60 at the cathode electrode of the diode 72 while the secondary 108 is connected by its right-hand terminal to the anode electrode of a diode 112 associated with a source of positive control voltage 100. The source 100 includes a diode 114 and a capacitor 116 serially connected between the aforementioned secondary winding of the transformer 21 and ground. The cathode electrode of the diode 114 is connected to the anode electrode of the diode 112 by a resistor 118. The cathode of the diode 112 is connected to the junction of a resistor 120 and the anode electrode of a diode 122, which are serially connected between the cathode electrode of the diode 114 and ground. A capacitor 124 is connected across the diodes 112 and 122 to provide an AC bypass to ground.

Each of the secondary windings 106 and 108 are additionally connected with a capacitor and a variable inductor, the inductors being adjusted for series resonance at specific separate frequencies. The winding 106 is connected in series with an adjustable inductor 130 and a capacitor 132, while the secondary winding 108 is connected in series with an adjustable inductor 134 and a capacitor 136. When the primary winding 88 of the transformer 90 is energized by an appropriate signal from transmitter 80, the corresponding one of the series tuned circuits (that is, one of the circuits including the inductor 130 and capacitor 132 or the inductor 134 and capacitor 136) which is resonant at the transmitted frequency will develop a substantially sinusoidal voltage having a relatively high peak to peak value (e.g. 200 volts) at the junction of its inductor and capacitor. This AC voltage is applied to the corresponding one of neon switching tubes 30, 32 by a corresponding one of resistors 138 and 140. The resistor 138 couples the junction of the units 130 and 132 to module terminal 26, and the resistor 140 couples the junction of the units 134 and 136 to module terminal 28.

The peak value of the AC voltage applied to the appropriate neon switching tube 30 or 32 exceeds the ionizing voltage of that tube and, furthermore, is at a frequency (for example, in the typical television receiver remote control frequency range of 34 to 45 kHz. sufficiently high that ionization (activation) of the neon tube is maintained continuously. The ionized neon tube connects its associated source (60 or 100) of relatively low unidirectional control voltage to capacitor 24.

If the transmitted signal is at the resonant frequency of the inductor 130-capacitor 132 combination, the neon tube switch 30 will be activated and will permit the flow of direct current between the storage capacitor 24 and the source of negative control voltage 60. The path is from the junction of the resistor 74 and diode 72 through the secondary transformer winding 106, the variable inductor 130, the resistor 138, and the neon tube 30 to the storage capacitor 24. In a like manner, should the transmitted signal be at the resonant frequency of the variable inductor 134-capacitor 136 arrangement, the neon tube switch 32 would be actuated and the storage capacitor 24 would be connected for direct current flow to the source of positive control voltage 100. In this case, the path would be from the junction of the resistor 118 and the diode 112 through the secondary transformer winding 108, the adjustable inductor 134, the resistor 140, and the neon tube 32 to the storage capacitor 24. By selectively actuating the neon tube switches 30 and 32, charge may either be added to or taken off the storage capacitor 24. This results in an adjustable setting, by remote control action, of the voltage on the gate electrode of the field effect transistor 14. Once the proper amount of charge is supplied to the storage capacitor 24, the operating neon switch is open circuited by removing the transmitted signals. The storage capacitor 24 will then be disconnected from the source of control potential 100 or 60 which was employed in adjusting its charge.

The rate of charging of the storage capacitor 24 is determined by the value of the resistor 74 for the source of negative control potential 60 and by the value of the resistor 118 for the source of positive control potential 100. These resistors are selected such that the rate of change of the charge on the storage capacitor 24 is gradual. The diode arrangements in the potential sources 60 and 100 limit the voltage to which the storage capacitor 24 may be charge and confines the charging to a linear portion of the exponential charge curve. By making the change of charge gradual and linear, accurate remote control adjustment is enhanced.

Since the input impedance of the gate electrode of the transistor 14 is extremely high, the charge on the storage capacitor 24 leaks off at an extremely slow rate (e.g. with a time constant of the order of weeks). The voltage level at the gate electrode of the transistor 14 is thereby maintained and the resultant conductivity level of the device stabilized. It is important that the charge on the storage capacitor 24 not be permitted to leak off, else the voltage at the gate electrode of the device would change to produce a change in the control of the audio processing circuitry 12. To prevent charge leakage, the module 10 is encapsulated. It is also desired that there be no leakage of charge through the switching means which connects and disconnects the storage capacitor to the source of control potential employed. The neon tube switches 30 and 32, because of the high leakage resistance associated with their off condition, provide the desired extremely low charge leakage.

It should be noted that the manual control afforded by variable resistor 52 permits adjustment of a quiescent or initial input voltage to transistor 14 within the range of 0 to −1.4 volts while, by virtue of remote control of the charge on capacitor 24, the operating input voltage of transistor 14 may be adjusted within the wider range of +0.7 volts to −2.1 volts. The latter operating range is set by the voltage supplies 60 and 100 and is selected to accommodate any variations in characteristics of the neon tube switches 30 and 32.

To further prevent any possible change in the charge on the storage capacitor 24 during that period of time when the system is not in operation, means are provided for disconnecting the primary winding of the transformer 21 from its source of power and, hence, inactivating the source of operating potential 20 for the transistor 14. This means may include a switch 152 which is connected in series with the primary winding of the transformer 21. A winding 154 is also included and is adapted to actuate the switch when energized. The winding 154 interconnects the collector electrode of an added transistor 156 and an additional source of operating potential 50. The base electrode of the transistor 156 is connected to ground by a variable inductor 158 and the emitter electrode of the transistor is connected to ground by a resistor 160. An adjustable inductor 162 is coupled to the winding 158 and is serially connected with a capacitor 164 between the left- and right-hand terminal of the secondary winding 108 of transformer 90. The transformer action between the inductors 162 and 158 is necessary to isolate the direct current voltage associated with the transistor 156 from the module charging circuits.

The above-mentioned adjustable inductor 162 and capacitor 164 are adjusted to be series resonant at the desired frequency. When the transmitter transmits signals at this frequency, the transistor 156 is rendered conductive and current flows in its collector to emitter path. The resulting current flow through the winding 154 then opens or closes the relay switch 152, depending on the switch's previous state. A capacitor 166 is connected across the winding 154 to provide filtering of the voltage across the winding 154. A capacitor 168 is connected across the switch of the relay to prevent arcing and the generation of undesired radio frequency signals. A master switch 170 is provided for completely turning off the system. Normally, the switch 170 is closed and the source of operating potential 50 is energized to permit remote turn on of the system. It should be noted that several module 10 arrangements may be used with the windings 106 and 108 by utilizing a parallel arrangement of these modules with the windings 106 and 108. However, the series connected inductor and capacitor associated with each module must be resonant at a unique frequency. In this manner, additional functions can be added to the receiver, for example, tint and color control.

I claim:

1. The combination comprising:

a field effect transistor having a source electrode, a drain electrode and a gate electrode, said source and drain electrodes interconnected with circuit means to form an electrical circuit operable to control functions in an electrical apparatus by changes in the conductivity of the source-drain electrode current path of said transistor:

a capacitor connected to the gate electrode of said transistor;

a source of control voltage;

means for coupling said source of control voltage to said capacitor to establish the conductivity of said transistor, said means including a switching tube having a leakage resistance characteristic effective in preventing the leakage of stored charge from said capacitor and a switching characteristic requiring a voltage of a magnitude in excess of said control voltage to render said switching tube conductive; and means coupled to said switching tube and responsive to remotely generated signals for causing a voltage to be applied to said switching tube, said voltage being of a greater magnitude than said control voltage and sufficient to render said switching tube conductive.

2. The combination as defined in claim 1 wherein said switching tube is a neon gas tube.

3. The combination comprising:

a field effect transistor having a source electrode, a drain electrode and a gate electrode, said source and drain electrodes interconnected with circuit means to form an electrical circuit operable to control functions in an electrical apparatus by changes in the conductivity of the source-drain electrode current path of said transistor;

a capacitor connected to the gate electrode of said transistor;

a source of positive control voltage and a source of negative control voltage;

means for coupling said sources of control voltage to said capacitor to establish the conductivity of said transistor, said means including first and second switching tubes respectively coupling said sources of positive and negative control voltage to said capacitor, with each of said tubes exhibiting a leakage resistance characteristic effective in preventing the leakage of stored charge from said capacitor and a switching characteristic requiring a voltage of a magnitude in excess of said control voltages to render said switching tube conductive; and means coupled to said switching tube and responsive to remotely generated signals for selectively causing a voltage to be applied to one of said switching tubes, said voltage being of a greater magnitude than said control voltages and sufficient to render said selected one switching tube conductive.

4. The combination as defined in claim 3 wherein said first switching tube and said second switching tube are neon gas tubes.

5. The combination as defined in claim 3 wherein said field effect transistor is of the insulated gate variety.

6. The combination comprising:

A semiconductor device having a first electrode, a second electrode and a control electrode exhibiting a high input impedance, said first and second electrodes interconnected with circuit means to form an electrical circuit operable to control functions in an electrical apparatus by changes in the conductivity of the first-second electrode current path of said semiconductor device;

a capacitor connected to the control electrode of said device;

a source of control voltage;

means for coupling said source of control voltage to said capacitor to establish the conductivity of said semiconductor device, said means including a switching tube having a leakage resistance characteristic effective in preventing the leakage of stored charge from said capacitor and a switching characteristic requiring a voltage of a magnitude in excess of said control voltage to render said switching tube conductive; and means coupled to said switching tube and responsive to remotely generated signals for causing a voltage to be applied to said switching tube, said voltage being of a greater magnitude than said control voltage and sufficient to render said switching tube conductive.

7. An electric circuit comprising:

a device having a first electrode, a second electrode and a control electrode with a high input impedance, the voltage at said control electrode determining the conductivity of the first to second electrode path of said device;

a storage capacitor connected to the control electrode of said device;

a transformer having a primary winding, a first secondary winding with a first end and a second end and a second secondary winding with a first end and a second end;

a first switching tube connected to said control electrode;

first means for interconnecting the first end of said first secondary winding and said first switching tube;

a second switching tube connected to said control electrode;

second means for interconnecting the first end of said second secondary winding and said second switching tube;

a source of positive control voltage connected to the second end of said first secondary winding; and a source of negative control voltage connected to the second end of said second secondary winding.

8. An electric circuit as defined in claim 7 wherein said first means is a first inductor serially connected with a first capacitor, said first inductor and said first capacitor series resonant at a first frequency, and said second means is a second inductor serially connected with a second capacitor; said second inductor and said second capacitor series resonant at a second frequency.

9. An electric circuit as defined in claim 8 including means for remotely controlling the energization of the primary winding of said transformer at said first frequency and at said second frequency.

10. In signal processing apparatus of the type adapted to be remotely controlled by the transmission of remotely generated signals of predetermined frequencies, an electric circuit comprising:

a field effect transistor having a source electrode, a drain electrode and a gate electrode, said source and drain electrodes interconnected with circuit means such that changes in the conductivity of the source-drain electrode current path of said transistor are operable to control functions in said apparatus;

a storage capacitor connected to the gate electrode of said transistor;

a first terminal adapted to be energized by a source of positive DC potential;

a second terminal adapted to be energized by a source of negative DC potential;

first means connecting said storage capacitor to said first terminal and including a first gaseous switching tube;

second means for connecting said storage capacitor to said second terminal including a second gaseous switching tube; and means coupled to said first and said second gaseous switching tubes and responsive to said remotely generated signals for selectively causing an alternating voltage to be applied to one of said first and second gaseous switching tubes, said alternating voltage of a sufficient magnitude to ionize said selected one tube gas such that a low DC impedance path exists between one of said first and said second terminals and said storage capacitor.